US009736626B2

(12) United States Patent
Peroulas (10) Patent No.: US 9,736,626 B2
(45) Date of Patent: Aug. 15, 2017

(54) METHOD AND APPARATUS FOR ESTIMATING SPEED OF A MOBILE TERMINAL

(71) Applicant: ZTE Wistron Telecom AB, Stockholm (SE)

(72) Inventor: James Peroulas, University City, MO (US)

(73) Assignee: ZTE Wistron Telecom AB, Stockholm (SE)

(*) Notice: Subject to any disclaimer, the term of this patent is extended or adjusted under 35 U.S.C. 154(b) by 0 days.

(21) Appl. No.: 14/356,155

(22) PCT Filed: Nov. 5, 2012

(86) PCT No.: PCT/SE2012/051201
§ 371 (c)(1),
(2) Date: May 3, 2014

(87) PCT Pub. No.: WO2013/066260
PCT Pub. Date: May 10, 2013

(65) Prior Publication Data
US 2014/0248907 A1    Sep. 4, 2014

Related U.S. Application Data

(60) Provisional application No. 61/556,135, filed on Nov. 4, 2011.

(51) Int. Cl.
*H04W 24/00*    (2009.01)
*H04W 4/02*    (2009.01)
*G01S 11/10*    (2006.01)

(52) U.S. Cl.
CPC ............... *H04W 4/02* (2013.01); *G01S 11/10* (2013.01)

(58) Field of Classification Search
CPC ........................................................ H04W 4/02
See application file for complete search history.

(56) References Cited

U.S. PATENT DOCUMENTS

| 2005/0059356 | A1 | 3/2005 | Lee et al. |
| 2006/0128314 | A1* | 6/2006 | Kim ................ G01S 11/10 455/67.11 |

(Continued)

FOREIGN PATENT DOCUMENTS

| CN | 1638495 A | 7/2005 |
| EP | 2 224 606 A1 | 9/2010 |

(Continued)

OTHER PUBLICATIONS

International Search Report and Written Opinion mailed on May 27, 2013 for International Application No. PCT/SE12/51201, filed Nov. 5, 2012 (5 pages).

(Continued)

*Primary Examiner* — Idowu O Osifade
(74) *Attorney, Agent, or Firm* — Perkins Coie LLP (57) ABSTRACT

Systems, devices and techniques for wireless communications include receiving a plurality of wireless transmissions over an observation period from a transmitter of a mobile terminal, calculating a plurality of frequency offset values based on the received plurality of wireless transmissions and estimating a speed value based on the plurality frequency offset values. In some implementations, the speed value is determined as a function of a computed frequency offset measurement error. Implementations can be made to include estimating channel characteristics in communication between a base station and the mobile terminal based on the estimated speed and optimizing a property in communications with the mobile terminal based on the estimated channel characteristics. In some implementations, the prop- (Continued)

erty can include a modulation scheme or scheduling of transmissions for communications between the base station and the mobile terminal.

15 Claims, 4 Drawing Sheets

(56) References Cited

U.S. PATENT DOCUMENTS

| | | |
|---|---|---|
| 2008/0171515 A1* | 7/2008 | Kim .................... H04L 27/2657 455/63.1 |
| 2010/0020909 A1 | 1/2010 | Jung et al. |
| 2010/0222001 A1 | 9/2010 | Sangary |
| 2011/0299505 A1* | 12/2011 | Unno .................... H04W 36/32 370/331 |
| 2012/0287874 A1* | 11/2012 | Oketani .............. H04L 27/0014 370/329 |
| 2013/0023302 A1* | 1/2013 | Sivanesan ............ H04W 36/32 455/525 |

FOREIGN PATENT DOCUMENTS

| | | |
|---|---|---|
| WO | 98/24251 A2 | 6/1998 |
| WO | 2006/067680 A1 | 6/2006 |

OTHER PUBLICATIONS

Chinese Office Action dated Aug. 5, 2015 for Chinese Patent Application No. 201280065849.6, filed Nov. 5, 2012 (6 pages).
Chinese Office Action dated Oct. 9, 2016 for Chinese Patent Application No. 201280065849.6, filed Nov. 5, 2012 (8 pages).

* cited by examiner

METHOD AND APPARATUS FOR ESTIMATING SPEED OF A MOBILE TERMINAL

PRIORITY CLAIM

This patent document timely claims the priority and all benefits of prior U.S. Provisional Patent Application No. 61/556,135 entitled "METHOD AND APPARATUS FOR ESTIMATING SPEED OF A MOBILE TERMINAL" that was filed at the U.S. Patent and Trademark Office on Nov. 4, 2011 and was assigned by inventor James Peroulas to ZTE WISTRON TELECOM AB on Nov. 29, 2011.

TECHNICAL FIELD

This patent document relates to systems, devices and techniques for estimating speed of a mobile terminal in a wireless communications system.

BACKGROUND

In wireless mobile communications systems, the transmitter and the receiver often perform operations to maintain or improve the performance of the communication channel. For example, in a cellular network (e.g., 2G, 3G, 4G, CDMA, GSM, LTE, etc.), the base station and mobile terminals may periodically estimate or measure (or provide data useful estimation of) transmission characteristics of the channel between the base station and the mobile terminal. The obtained channel information may be used to optimize modulation scheme used for transmission, scheduling transmissions over the network, and so on.

However, due to mobility of the transmitter and/or the receiver, channel characteristics measurement may vary rapidly or may be inaccurately measured. This inaccuracy may be partially alleviated by estimating the travel speed of a mobile terminal. Presently available techniques make use of multiple spatially separated antennae to receive signal from a mobile terminal and estimate the speed of travel of the mobile terminal. Some techniques use a priori knowledge of the mobile terminal's travel direction for estimating the rate of travel. Due to various practical reasons, e.g., the presence of multi-path, such speed measurement techniques often provide inaccurate or unsatisfactory results. Therefore, there is a need for improved techniques for estimating speed of a mobile terminal.

SUMMARY

This patent document provides, among others, systems, devices and techniques for estimating the speed of a mobile terminal in a wireless communications network and the information of the estimated speed can be used to estimate the channel characteristics in communication with the moving mobile terminal.

In one aspect, a wireless communications method is disclosed. A plurality of wireless transmissions is received. A plurality of frequency offset values is calculated based on the received plurality of wireless transmissions. A speed value is estimated based on the plurality of frequency offset values.

In another aspect, a wireless communications device includes a module for receiving a plurality of transmissions, a module for calculating a plurality of frequency offset values based on the received plurality of wireless transmissions and a module for estimating a speed value based on the plurality of frequency offset values.

In another aspect, a computer program product is disclosed, having stored thereupon code for receiving a plurality of transmissions, code for calculating a plurality of frequency offset values based on the received plurality of wireless transmissions and code for estimating a speed value based on the plurality of frequency offset values.

In yet another aspect, a communication method for communications between a user equipment and a base station in a wireless communications network is provided to include operating one or more antennas of a base station to receive a plurality of wireless transmissions from a user equipment; and determining a plurality of frequency offset values based on the received plurality of wireless transmissions, wherein each frequency offset value is proportional to a measurement angle between a plurality of transmitted reference symbols and a corresponding plurality of received reference symbols. This method further includes estimating a speed of the user equipment based on the plurality frequency offset values. This method can be implemented to further include estimating channel characteristics in communication between the base station and the user equipment based on the estimated speed and optimizing a property in communications with the user equipment based on the estimated channel characteristics. In some implementations, the property can include a modulation scheme or scheduling of transmissions.

This and other aspects and their implementations are described in greater detail in the drawings, the description and the claims.

DETAILED DESCRIPTION

This patent document discloses techniques for estimating the speed of a moving mobile terminal in a wireless communication system in connection with estimating the channel characteristics in communication with the moving mobile terminal. In a wide area wireless network such as a long term evolution (LTE) network, the base station is typically stationary and one or more user equipment (e.g., wireless cellular telephones, tablets, portable computers, etc.) may be mobile and may move around relative to the base station. While the disclosed techniques have been disclosed as being implemented at a base station in a wireless cellular network, the techniques can be equally applicable to other mobile deployment where a mobile communication device moves relative to a stationary base station or access point, such as a wireless local area network, e.g., based on 802.11x standards or Wi-MAX standard and so on.

The disclosed techniques can be used to measure the speed of a mobile terminal by making measurements on multiple received transmissions from the mobile terminal at a receiver. Such measurements at the receiver can be processed to extract the speed of the mobile terminal. The receiver can be, for example, a base station in the network. The speed estimate can be used to categorize the mobile terminal into one of multiple classes, e.g., as a fast moving, a slow moving, or an intermediate speed terminal. This speed information can be used to adapt operational parameters of the wireless network. These operational parameters include, e.g., selecting a modulation scheme for downlink transmissions to the mobile terminal, determining schedule of reference signal transmissions to the mobile terminal, providing speed input to the application layer of the UE and the network-side, and so on.

In the description provided below, a theoretical framework is first provided, disclosing how speed measurements can be achieved based on the measurements at the receiver. Next, practical embodiments of the theoretical framework that take into account inherent measurement inaccuracies and limitations are disclosed.

Figure 1:
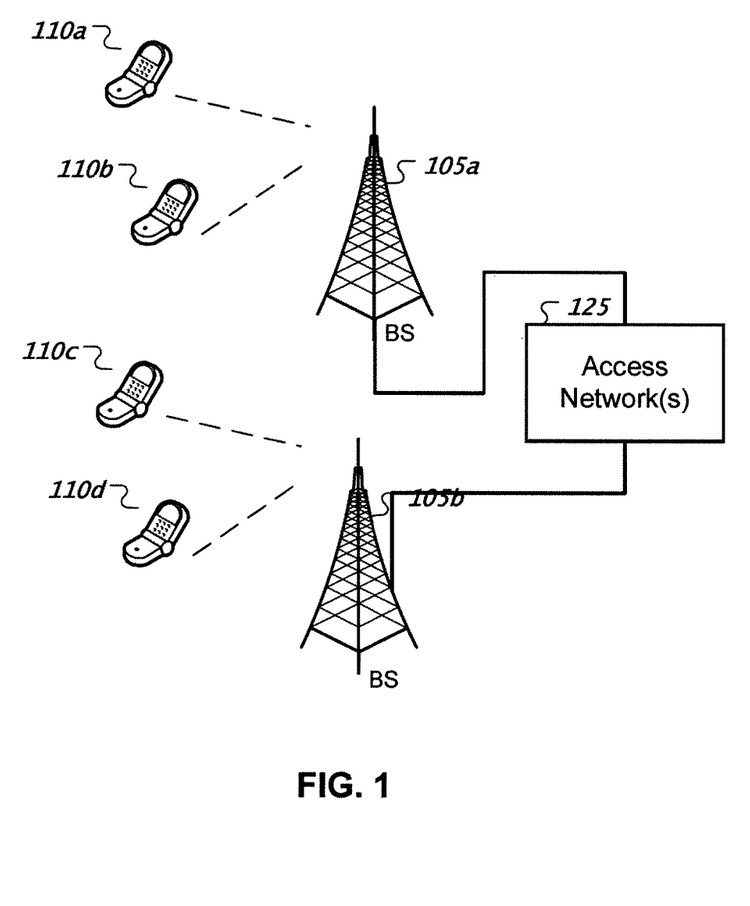
FIG. 1 is a block diagram representation of a wireless communications network.

FIG. 1 shows an example of a wireless communication system. A wireless communication system can include one or more base stations (BSs) 105a, 105b, one or more wireless devices or mobile terminals 110a, 110b, 110c, 110d, and an access network 125. A base station 105a, 105b can provide wireless service to wireless devices 110a, 110b, 110c and 110d in one or more wireless sectors. In some implementations, a base station 105a, 105b includes directional antennas to produce two or more directional beams to provide wireless coverage in different sectors.

The access network 125 can communicate with one or more base stations 105a, 105b. In some implementations, the access network 125 includes one or more base stations 105a, 105b. In some implementations, the access network 125 is in communication with a core network (not shown in FIG. 1) that provides connectivity with other wireless communication systems and wired communication systems. The core network may include one or more service subscription databases to store information related to the subscribed wireless devices 110a, 110b, 110c and 110d. A first base station 105a can provide wireless service based on a first radio access technology, whereas a second base station 105b can provide wireless service based on a second radio access technology. The base stations 105a and 105b may be co-located or may be separately installed in the field according to the deployment scenario. The access network 125 can support multiple different radio access technologies.

Various examples of wireless communication systems and access networks that can implement the present techniques and systems include, among others, wireless communication systems based Code division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE), and Worldwide Interoperability for Microwave Access (WiMAX). In some implementations, a wireless communication system can include multiple networks using different wireless technologies. A dual-mode or multi-mode wireless device includes two or more wireless technologies that could be used to connect to different wireless networks. In some implementations, a wireless device can support Simultaneous Voice-Data Operation (SV-DO).

Figure 2:
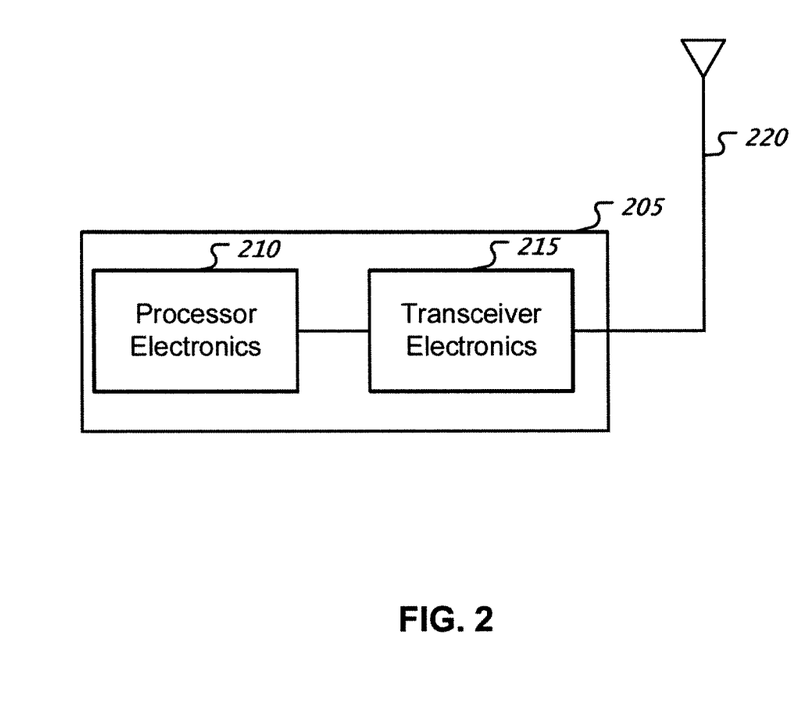
FIG. 2 is a block diagram representation of a wireless communications device.

FIG. 2 is a block diagram representation of a portion of a radio station 205 which can be a base station 205, a wireless device served by a base station such as a mobile terminal. The radio station 205 can include processor electronics 210 such as a microprocessor that implements one or more of the wireless techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215.

As discussed in greater detail in below, the disclosed techniques may be useful in a communications system where the chosen frequency offset estimation (FOE) algorithm produces frequency offset estimates whose variance is a function of the travel speed of the transmitter. An example of such a system is an LTE uplink where the FOE algorithm produces estimates by comparing the reference symbols transmitted by the terminal or user equipment (UE) in adjacent slots.

In a wireless communications system where either the transmitter or the receiver is in motion, it is often useful to know the speed of the terminal that is in motion. This information may be used for estimating one of which is to adjust the filtering of the estimates of the communication channel. If the moving terminal is known to be moving very slowly, more estimates can be filtered together so as to improve the quality of the channel estimates. On the other hand, if the moving terminal is moving very quickly, it may be possible that no time domain filtering of the channel estimates is possible.

Figure 3:
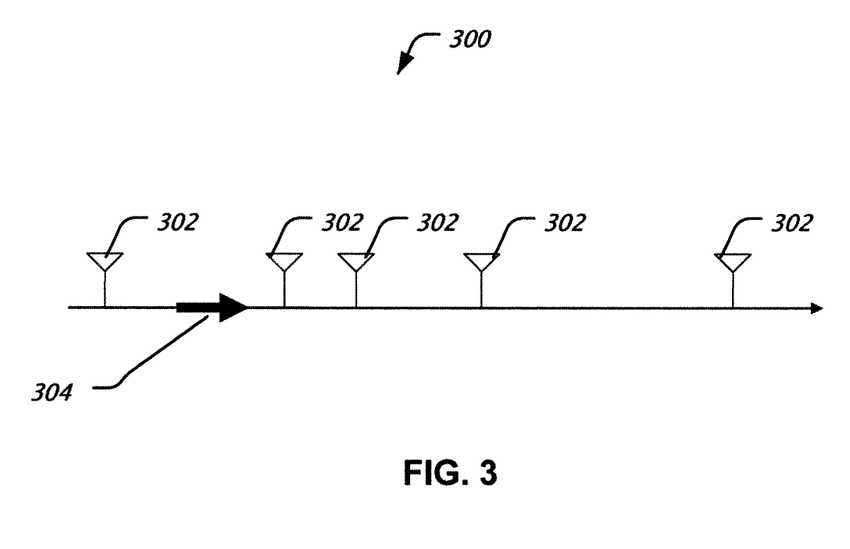
FIG. 3 illustrates an arrangement of antennae for estimating speed of a transmitter.

The velocity of a terminal or UE can be estimated by various techniques. One example of the speed estimation 300 is shown in FIG. 3 where a mobile terminal 304 (indicated by the thick arrow) is moving to the right along a known path. This might be the case when a terminal is located inside a train or even when traveling in a car along an expressway or a road. Multiple receiving antennas 302 can be placed at known locations along the known path of travel of the terminal to measure the transmitted power from the moving terminal 304. The received power at a particular antenna 302 from the moving terminal varies with the distance between the particular antenna 302 and the moving terminal and peaks when the terminal is closest to the particular antenna 302. The terminal's velocity can be calculated by the timing when the terminal 304 passes by each antenna 302. The mobile terminal 304 can be detected as passing by a certain antenna 302 by measuring the received power at the antenna 302 which will peak when the terminal is located closest to that antenna 302.

Although the technique shown in FIG. 3 may determine the velocity of the terminal 304, it is restricted to be used when the terminal 304 is traveling along a fixed path. It would be beneficial to be able to determine the speed of a terminal 304 regardless of whether it was traveling along a fixed path that is known in advance.

In many wireless communication network, multi-carrier transmission techniques are used for communication between terminals 304 and the network. For example, industry standards such as WiMAX and Long Term Evolution (LTE) use orthogonal frequency domain multiplexing (OFDM) modulation in which a terminal 304, also called user equipment UE in this document, transmits uplink signals to the base station (called eNodeB in LTE). When the terminal 304 moves relative to the base stations, subcarrier frequencies in the transmission from the terminal, as received and perceived at a receiving base station, may change due to Doppler shift caused by the movement of the terminal 304. A base station that receives multiple OFDM transmissions from the terminal 304, e.g., over a number of transmission frames, may be able to estimate the Doppler shift caused by the relative movement in the terminal 304 from one reception to the next. For example, LTE uses two subframes of transmissions in a given transmission frame where the disclosed techniques can use the two subframes in LTE to extract speed information of the mobile terminal.

As further discussed below in an illustrative example of OFDM based communication in LTE networks, the receiving side (e.g., the base station) could monitor received transmissions over a period of time, maintain a running average received frequency estimation, calculate instantaneous error or deviation in frequency estimate from the average estimated frequency and thereby determine instantaneous frequency of the UE. The accuracy of the instantaneous speed estimate can be improved by subtracting contribution from a noise term which generally adds a randomness to the instantaneous measurements. As further described below, this noise, or level of randomness, can be measured and subtracted using empirical data.

Let $N_{sc}$ represent the number of subcarriers that a UE is scheduled to transmit on. It is assumed that frequency hopping is disabled and that the UE uses the same subcarriers on both of the slots of the subframe in which it is scheduled to transmit. Let P1 and P2 represent the reference symbols transmitted by the UE in each slot and thus both P1 and P2 are both vectors of length $N_{sc}$. Under the LTE specification, the magnitude of all the complex elements in both of these vectors is 1.

Let H be a length $N_{sc}$ vector representing the channel response between the UE and the base station on the subcarriers being used by the UE and it is assumed that the channel is mostly constant between the two slots of the subframe. Let R1 and R2 be length $N_{sc}$ vectors representing the signal received by the base station on the UE's occupied subcarriers.

The relationship between the length and the reference symbols may be written as:

$$R_i(n) = H(n)P_i(n) + N_i(n) \qquad \text{Equation (1)}$$

for i being 1 or 2 and $N_i$ being a zero mean complex Gaussian noise vector of length $N_{sc}$ and power $\sigma_n^2$.

The notation A(n) for a vector A indicates the $n^{th}$ element of vector A where A(1) represents the first element.

Let $Y_1$ and $Y_2$ be length $N_{sc}$ vectors and be defined as:

$$Y_i(n) = \frac{R_i(n)}{P_i(n)} \qquad \text{Equation (2)}$$

The frequency offset is estimated as the change in the phase difference between the signals representing the received signals with respect to the corresponding transmitted signal:

$$\hat{f} = \frac{\angle(Y_0^H Y_1)}{\pi} * 1000 \qquad \text{Equation (3)}$$

where "H" is the Hermitian operation.

Suppose the communications channel can be modeled in the time domain as a convolution with an added frequency offset according to:

$$r(t) = (h(t) \otimes s(t))e^{j2\pi ft} + n(t) \qquad \text{Equation (4)}$$

where s(t) is the transmitted signal, h(t) is the channel impulse response, r(t) is the received signal, n(t) is thermal noise, f is the frequency offset and $\otimes$ represents convolution.

In this situation, the measured frequency offset $\hat{f}$ may be equal to the actual frequency offset f, plus Gaussian noise:

$$\hat{f} = f + e_{thermal} \qquad \text{Equation (5)}$$

where $e_{thermal}$ represents the measurement error introduced by thermal noise. In this document, all of the noise sources that corrupt the received signal is referred to as "thermal noise" regardless of whether this noise truly is a result of thermal noise or any other noise source, such as, interference noise. It can be shown that the thermal noise is zero mean and has a variance (power) of:

$$\text{var}[e_{thermal}] = \sigma_{thermal}^2 \approx \frac{10^6}{\pi^2 N_{SC}} \left( \frac{\sigma_n^2}{\sigma_s^2} + \frac{\sigma_n^4}{2\sigma_s^4} \right) \qquad \text{Equation (6)}$$

where $\sigma_s^2$ is the average received signal power per subcarrier. ie:

$$\sigma_s^2 = \frac{\|H\|^2}{N_{sc}} \qquad \text{Equation (7)}$$

where $\|H\|$ is the 2-norm of vector H.

Based on the above, if either the receiver noise power $\sigma_n^2$ tends to zero or the received signal power $\sigma_s^2$ tends to infinity, $\sigma_{thermal}^2$ tends to zero and the measured frequency offset will simply be equal to the frequency offset f.

Real world propagation channels, however, are not accurately modeled by Equation (4). Instead, due to the fact that different paths propagate from the UE from different directions, each path tends to have its own Doppler induced frequency offset. A more accurate model of the propagation channel is as follows:

$$r(t) = n(t) + \sum_{i=1}^{N_P} G_i s(t - D_i)e^{j2\pi f_i t} \qquad \text{Equation (8)}$$

Hence, the channel is modeled as the sum of $N_p$ propagation paths from the UE to the base station. Each propagation path has a unique time delay $D_i$, a unique complex channel gain $G_i$, and a unique frequency offset $f_i$.

The previously described algorithm for frequency offset estimation (FOE), when applied to a more realistic communications channel, such as the one described in Equation (8), produces frequency offset estimates that vary even if there is no thermal noise in the system. In a more realistic communications channel, the estimated frequency offset can be modeled as:

$$\hat{f} = f_{avg} + e_{vel} + e_{thermal} \qquad \text{Equation (9)}$$

That is, the measured frequency offset should be equal to a certain average frequency offset $f_{avg}$, corrupted as before with measurement noise $e_{thermal}$, but also a different type of noise called $e_{vel}$ which is due to the fact that each propagation path has its own frequency offset.

As an example, suppose that the propagation channel between the UE and the base station is composed of only two paths. One path has a frequency offset of 688 Hz and the other has a frequency offset of 0 Hz. Even in the absence of thermal noise, the frequency offset measured by the FOE algorithm described above will vary. In some implementations, approximately ⅓ of the time, the FOE algorithm will produce an estimate near 344 Hz and ⅔ of the time it will produce an estimate near 660 Hz. Even if the channel is not changing, even if there is no noise in the system, if the frequency offset is measured at many points in time, the frequency offsets will vary from measurement to measurement.

The reason that the frequency offset measurements vary is that the measured frequency offset is actually a function of the phase of the propagation paths at the beginning of the frequency offset measurement. Frequency offset measurements that begin at random time offsets may have a different, effectively random, relationship between the phases of the paths and hence the measured frequency offset may have a random component, regardless of whether there is thermal noise present in the receiver.

The power of $e_{vel}$, $\sigma_{vel}^2$, depends on the particular channel being experienced and also on the velocity of the UE. For example, if the channel is composed of a single path ($N_p=1$), then $\sigma_{vel}^2$ is equal to zero and the only randomness that appears in the frequency offset measurements is due to thermal noise.

For channels with larger $N_p$ values (approximately 20 may be sufficient), and varied $f_i$ values, $\sigma_{vel}^2$ is related very closely to the velocity of the UE. For example, for the Winner II channels B1, B2, C1, C2, and C3, the following approximate relationship exists:

$$v_{UE} \approx \frac{\sigma_{vel}}{1.4} \quad \text{Equation (10)}$$

where $v_{UE}$ is the velocity of the UE expressed in kph.

The coefficient 1.4 in the above equation was measured empirically by simulating thousands of channels and only provides a somewhat loose connection between $\sigma_{vel}$ and $v_{UE}$. The actual relationship between these values depends on the specific channel being experienced. However, this general relationship can be used to provide a rough estimate of the speed of the UE. Often, the communications system is less interested in knowing the precise speed of the UE and is instead interested in knowing whether the UE is moving 'slowly', at a 'medium' speed, or very 'quickly'. Thus, Equation (10) may be sufficient, for many channel types, to characterize the UE's velocity either as 'slow', 'medium', or 'quick'.

In one implementation, the present technique for the speed estimation can be operated by first determining a relationship between $\sigma_{vel}$ and $v_{UE}$. This can be accomplished either through the use of computer simulations or in-the-field measurements. Often, the more accurate relationship tend to be the in-the-field measurements.

Whether simulations or measurements are performed, the procedure can be similar and can be performed in a noiseless or low noise environment. If simulations are being performed, simulations can be performed without noise. If in-the-field measurements are performed, these measurements may be restricted only to situations when the received signal power is much higher (20 dB or more) than the received noise power.

In some configurations, to establish an empirical relationship between $\sigma_{vel}$ and $v^{UE}$ the UE can be configured to travel at a certain velocity and the frequency offset can be measured repeatedly with the above-described algorithm. For the fixed UE speed, the position of the UE and the channel type can be varied for thousands of simulations and the frequency offset measurements can be analyzed to determine the average frequency offset and the variance of the frequency offset measurements. The variance of the frequency offset measurements can be used to obtain one data point relating $\sigma_{vel}$ and $v_{UE}$.

Various UE velocities can be simulated or measured so as to produce a function Q relating these two variables:

$$v_{UE} \approx Q(\sigma_{vel}) \quad \text{Equation (11)}$$

Here, Q is not restricted to being a linear function. One possibility is for Q to be a polynomial fit to the measured or observed data points.

This Q function can be created and stored in the base station to be used later. In some implementations, this Q function is not expected to be updated often and may be updated when it is known that the UE's channel characteristics have changed significantly.

During regular operation, the base station (eNodeB) can first perform channel estimation on the received signal so as to estimate the response from the UE. There are many ways that this can be accomplished in an LTE system which typically involve creating least-squares estimates for each subcarrier and then averaging the channel estimates among several adjacent subcarriers so as to produce the final filtered channel response.

If the filtered channel response is represented by $\hat{H}$, the following relationships can be obtained. The kth frequency offset measurement is estimated as:

$$\hat{f}(k) = \frac{\angle(Y_0^H Y_1)}{\pi} * 1000 \quad \text{Equation (12)}$$

The average received signal power can be estimated as:

$$\hat{\sigma}_s^2 = \frac{\|\hat{H}\|^2}{N_{sc}} \quad \text{Equation (13)}$$

The average receiver noise power can then be estimated as:

$$\hat{\sigma}_n^2 = \frac{\|\hat{H} \cdot P_1 - R_1\|^2 + \|\hat{H} \cdot P_2 - R_2\|^2}{2N_{sc}} \quad \text{Equation (14)}$$

where a·b represents the element-wise multiplication of vectors a and b. In other words, the receiver noise power is estimated by comparing the actual received signal $R_i$ against the predicted received signal $\hat{H} \cdot P_i$. Any difference between the two is assumed to come from receiver noise. Some differences between these two quantities may be due to imperfect channel estimation. For the purposes of estimating the velocity of a UE, it is reasonable to assume that the differences are due, in large part, to receiver noise.

The measurement error due to thermal noise for measurement k can then be calculated as:

$$\hat{\sigma}_{thermal}^2(k) \approx \frac{10^6}{\pi^2 N_{SC}} \left( \frac{\hat{\sigma}_n^2}{\hat{\sigma}_s^2} + \frac{\hat{\sigma}_n^4}{2\hat{\sigma}_s^4} \right) \quad \text{Equation (15)}$$

There are several methods available to calculate the variance of the frequency offset measurements. If it is known that the thermal noise is the same for all measurements one can simply wait to collect $N_{obs}$ measurements and perform the following:

$$\hat{\sigma}^2_{thermal,avg} = \frac{\sum_{i=1}^{N_{obs}} \hat{\sigma}^2_{thermal}(i)}{N_{obs}} \quad \text{Equation (16)}$$

$$\hat{f}_{avg} = \frac{\sum_{i=1}^{N_{obs}} \hat{f}(i)}{N_{obs}} \quad \text{Equation (17)}$$

$$\text{var}[\hat{f}] = \sigma^2_{tot} = \frac{\sum_{i=1}^{N_{obs}} |\hat{f}(i) - \hat{f}_{avg}|^2}{N_{obs}} \quad \text{Equation (18)}$$

$$\sigma^2_{vel} = \max(0, \sigma^2_{tot} - \hat{\sigma}^2_{thermal,avg}) \quad \text{Equation (19)}$$

$$\hat{v}_{UE} = Q(\sigma_{vel}) \quad \text{Equation (20)}$$

The number of observations necessary $N_{obs}$ can vary from scenario to scenario, can be a function of the thermal noise, and can also depend on the required accuracy in estimating the UE's velocity. In some implementations, this parameter ($N_{obs}$) may be set by trial and error and will be a tradeoff between UE speed estimation accuracy requiring large $N_{obs}$ values and measurement speed requiring small $N_{obs}$ values.

In various practical implementations, the thermal noise tends to vary in time. For example, the power received from the UE may vary significantly from one measurement to another. Also, the number of subcarriers that the UE is scheduled on may also vary. In this situation, the variance of the frequency offset measurements can be tracked iteratively and this tracking can allow for the thermal noise power to vary from measurement to measurement.

For every measurement, the base station may calculate the average value of all the previous observations:

$$\hat{f}_{avg}(1) = \hat{f}(1) \quad \text{Equation (21)}$$

$$\hat{f}_{avg}(k+1) = \frac{k\hat{f}(k) + \hat{f}(k+1)}{k+1} \quad \text{Equation (22)}$$

The above two equations are equivalent to the following equation (23). The previous equations are often preferable because they can be implemented iteratively.

$$\hat{f}_{avg}(k) = \frac{\sum_{i=1}^{n} \hat{f}(i)}{k} \quad \text{Equation (23)}$$

The error between the average of the previous samples and the current frequency offset measurement can be calculated as:

$$e(k) = \hat{f}(k) - \hat{f}_{avg}(k) \quad \text{Equation (24)}$$

A coefficient g, which is used as an internal parameter for further calculations, can be calculated and updated according to the following:

$$g(0) = 1 \quad \text{Equation (25)}$$

$$g(k) = g(k-1)C(k)\lfloor K(1 - |g(k-1)C(k)e(k)|^2) + 1 \rfloor \quad \text{Equation (26)}$$

$$\hat{\sigma}^2_{tot}(k) = \frac{1}{g(k)^2} \quad \text{Equation (27)}$$

$$C(1) = 1 \quad \text{Equation (28)}$$

$$C(k) = \sqrt{\frac{\hat{\sigma}^2_{tot}(k-1)}{\hat{\sigma}^2_{tot}(k-1) - \sigma^2_{mean}(k-1) + \sigma^2_{meas}(k)}} \quad \text{Equation (29)}$$

For the purposes of explanation, C(k) can be temporarily ignored and set to 1. Equation (26) then simplifies to:

$$g(k) = g(k-1)\lfloor K(1 - |g(k-1)e(k)|^2) + 1 \rfloor \quad \text{Equation (30)}$$

where g(k) is a coefficient that is constantly updated so that $|g(k-1)e(k)|^2$ is close to 1. If $|g(k-1)e(k)|^2$ is less than 1, g(k) can be set to a value somewhat greater than g(k-1) so that upon the next iteration, $|g(k-1)e(k-1)e(k)|^2$ may be closer to 1. If $|g(k-1)e(k)|^2$ is close to 1, then the power of e(k) is $$\frac{1}{g(k)^2}.$$

Thus, the above equation (30) is equivalent in function as an automatic gain control (AGC) circuit which attempts to keep the output of the AGC (g(k−1)e(k)) at a power level of 1. The power of the input to the AGC is simply the square of the inverse of the AGC loop gain.

The parameter K determines how rapidly the g(k) coefficient is allowed to adapt. Large K values will produce rapid adjustments but will produce very noisy power estimates. Similarly, small K values will produce slow adjustments but smoother power estimates. It is expected that K value smaller than 0.1 may be a reasonable choice for most applications.

Referring back to Equation (29), the C(k) coefficient is used to compensate for known changes in thermal noise power. For example, suppose that for measurement k−1, the total power was estimated to be 1 (i.e. $\hat{\sigma}^2_{tot}(k-1)=1$) and the thermal noise power was estimated to be 0.25 (i.e. $\hat{\sigma}^2_{thermal}(k-1)=0.25$). Suppose that for measurement k, it is known that the thermal noise power has increased to 1. Without examining the measurement for time instant k, it would be expected that the total power would increase since the noise power increased from 0.25 to 1.

The best estimate for $\sigma^2_{vel}(k-1)$ may be:

$$\hat{\sigma}^2_{vel}(k-1) = \max(0, \hat{\sigma}^2_{tot}(k-1) - \hat{\sigma}^2_{thermal}(k-1)) \quad \text{Equation (31)}$$

Therefore, assuming that $\sigma^2_{vel}$ changes slowly, the best a priori estimate for $\sigma^2_{tot}(k)$ would be:

$$\hat{\sigma}^2_{tot,apriori}(k) = \hat{\sigma}^2_{vel}(k-1) + \hat{\sigma}^2_{thermal}(k) \quad \text{Equation (32)}$$

Thus, the a priori estimate of $\hat{\sigma}_{tot,apriori}(k)$, in the example stated above, would be (1−0.25)+1=1.75. The a priori knowledge can be used to create a compensation factor that can be used to track changes in the thermal noise power. If $\sigma^2_{meas}(k-1) = \sigma^2_{meas}(k)$, C(k) will be 1. Thus, C(k) will only be non-singular if $\sigma^2_{meas}(k-1) \neq \sigma^2_{meas}(k)$.

It is possible for the denominator of Equation (29) to become zero or negative. If it is detected that the denominator has become zero or negative, then, one can output a default value for C(k). i.e., if the denominator is zero or negative, then C(k) will be set to $C_{default}$ where $C_{default}$ is chosen based on system simulations or experience.

One advantage of the above-disclosed technique is the ability to estimate the speed of the UE regardless of which direction the mobile terminal is travelling and regardless of whether the mobile terminal is travelling along a fixed, known path. Furthermore, the above technique can be used to produce velocity estimates regardless of whether the frequency offset measurement error is the same for all measurements or if it varies for each measurement.

Although a specific FOE algorithm has been described in this document, it should be noted that any FOE algorithm can be use for which the variance of the frequency offset estimates is a function of the speed of the moving terminal and for which the thermal noise induced measurement error can be estimated. That is, any FOE algorithm can be used as long as it produces both $\hat{f}(k)$ and $\sigma_{thermal}^2(k)$ for every measurement instant k and for which the variance of $\hat{f}(k)$ is a function of the velocity of the UE.

Furthermore, although this invention was described in the context of an LTE uplink communications system, it will work in any communications system for which an FOE algorithm exists that satisfies the conditions described in the previous paragraph.

Figure 4:
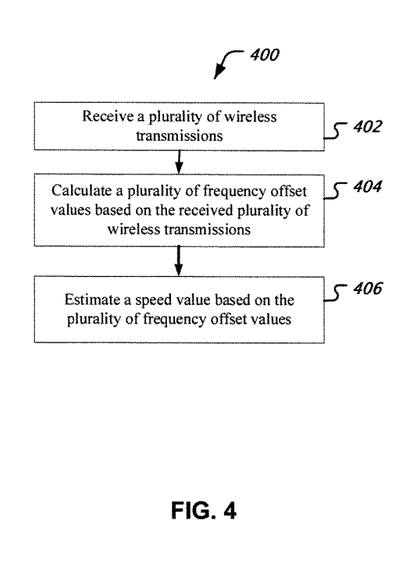
FIG. 4 is flow chart representation of a process of wireless communications.

FIG. 4 is a flow chart representation of a process 400 of wireless communication. In some implementations, the process 400 can be implemented at a network-side computer such as a computer at the base station. At 402, a plurality of wireless transmissions is received over an observation period. As discussed above, the transmissions may include reference signals transmitted from a UE to a base station. The observation period may comprise two subframes or may include $N_{sc}$ samples, as previously discussed. At 404, a plurality of frequency offset values is calculated based on the received plurality of wireless transmissions. The offset value calculations may be performed using techniques as previously described with respect to Equations (1) to (26). At 406, a speed value is estimated based on the calculated plurality of frequency offset values. In some implementations, the estimation of the speed value may be performed by computing a frequency offset measurement error (e.g., $e_{vel}$, as described above). The speed value may be then determined as a function (e.g., Equations 10 and 11) of the computed frequency offset measurement error. In some implementations, the function may be modeled based on a priori signal measurements (e.g., as described with respect to Equation 10). In an orthogonal frequency domain modulation (OFDM) network, such as LTE, the received signal transmission may be in pairs, with each pair corresponding to a first transmission in a first symbol in a transmission subframe and a second transmission in a second symbol in the transmission subframe.

Figure 5:
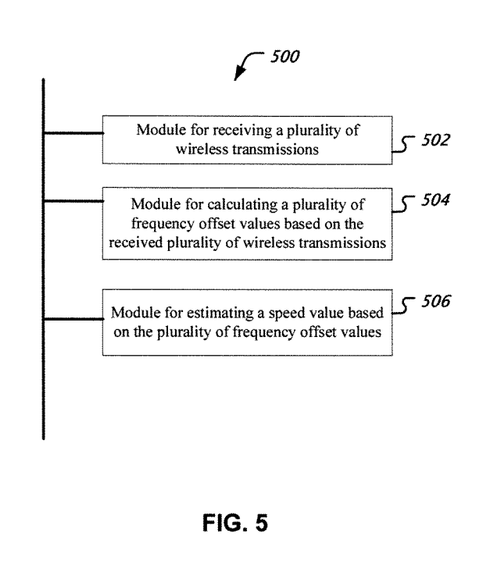
FIG. 5 is a block diagram representation of a portion of a wireless communications device.

FIG. 5 is a block diagram representation of a portion 500 of a wireless communications apparatus. Module 502 is for receiving a plurality of wireless transmissions. Module 504 is for calculating a plurality of frequency offset values based on the received plurality of wireless transmissions. Module 506 is for estimating a speed value based on the plurality frequency offset values. The apparatus 500 and modules 502, 504, 506 may further be configured to perform one or more of techniques disclosed in this patent document.

It will be appreciated that the present patent document discloses various techniques for estimating speed of a mobile terminal. In one aspect, the speed estimate may be useful to schedule transmissions from the mobile terminal. For example, transmissions from a faster moving mobile terminal may be scheduled to occur earlier than that of a slower moving mobile terminal, after the estimation of channel between the faster moving mobile terminal and the base station. Similarly, in another aspect, a faster moving mobile terminal may be handed off earlier, or prior to the mobile terminal reaching a cellular edge. In another aspect, reference signal transmissions to/from the faster moving mobile terminal may be scheduled to occur at a faster repetition rate.

It will also be appreciated that the disclosed speed estimation techniques lend themselves for a straightforward extension to multiple input multiple output (MIMO) networks. For example, in some implementations, when a UE has multiple transmit or receive antennae, the techniques disclosed above may be simply extended individually to each antenna and a speed estimation may be based on the average speed obtained from the multiple antennae. In some other implementations, the above disclosed speed estimation techniques may be implemented with respect to one antenna and the estimated speed may simply be used as the single measurement for a mobile terminal. Because when a mobile terminal is moving, it is generally expected that all transmit/receive antennae move at the same speed. Therefore, speed estimates based on calculations performed for a single antenna may be sufficient in many cases.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. An apparatus for wireless communications, comprising:
   a receiver implemented at a network-side computer at a base station that receives a plurality of wireless transmissions, wherein the plurality of wireless transmissions include reference symbols, the receiver including
   a processor that determines a plurality of frequency offset values based on the received plurality of wireless transmissions, wherein the processor is configured to:
      estimate, by the network-side computer at the base station, a first speed and a second speed based on the plurality of frequency offset values; and
      upon determining that the estimated first speed is greater than the estimated second speed, enabling, by the network-side computer at the base station, wireless transmissions to occur earlier from a mobile transmitter associated with the first speed than a mobile transmitter associated with the second speed.

2. The apparatus recited in claim 1, wherein the processor is further configured to:
   compute a frequency offset measurement error; and
   determine the speed value as a function of the computed frequency offset measurement error.

3. The apparatus recited in claim 2, wherein the computing the frequency offset measurement error includes averaging all previous frequency observations.

4. The apparatus recited in claim 2, wherein the processor is further configured to:
   model the function based on a priori measurements of received signals.

5. The apparatus recited in claim 1, wherein the plurality of wireless transmissions comprise a plurality of transmission signal pairs, wherein each transmission signal pair comprises a first transmission in a first symbol in a transmission subframe and a second transmission in a second symbol in the transmission subframe.

6. A computer program product comprising a non-volatile, non-transitory, computer-readable medium having instructions stored thereon, the instructions comprising code for:
   receiving a plurality of wireless transmissions at a base station;
   calculating, at the base station, a plurality of frequency offset values based on the received plurality of wireless transmissions;
   estimating a first speed value and a second speed value based on the plurality of frequency offset values; and
      upon determining that the estimated first speed value is greater than the estimated second speed value, enabling, by the base station, wireless transmissions at a higher rate from a mobile transmitter associated with the first speed value than from a mobile transmitter associated with the second speed value.

7. The computer program product recited in claim 6, wherein the code for estimating comprises code for:
   computing a frequency offset measurement error; and
   determining the speed value as a function of the computed frequency offset measurement error.

8. The computer program product recited in claim 7, further comprising code for:
   modelling the function based on a priori measurements of received signals.

9. The computer program product recited in claim 6, wherein the plurality of wireless transmissions comprise a plurality of transmission signal pairs, wherein each transmission signal pair comprises a first transmission in a first symbol in a transmission subframe and a second transmission in a second symbol in the transmission subframe.

10. A base station apparatus operable in a wireless communications network, comprising:
    one or more antennas at a first base station that receive a plurality of wireless transmissions;
    a processor that determines a plurality of frequency offset values based on the received plurality of wireless transmissions, wherein each frequency offset value is proportional to a measurement angle between a plurality of transmitted reference symbols and a corresponding plurality of received reference symbols, the processor configured to perform the steps of:
  estimating a first speed and a second speed based on the plurality of frequency offset values; and
  upon determining that the first speed is greater than the second speed, handing off, by the first base station, to a second base station, a user equipment associated with the first speed earlier than a user equipment associated with the second speed.

11. The base station apparatus as in claim 10, wherein the processor further:
  estimates channel characteristics in communication with the user equipment associated with the first speed, based on the estimated first speed;
  estimates channel characteristics in communication with the user equipment associated with the second speed, based on the estimated second speed; and
  optimizes a property for the user equipment associated with the first speed and the user equipment associated with the second speed based on the respective estimated channel characteristics.

12. The base station apparatus as in claim 11, wherein the property includes a modulation scheme or scheduling of transmissions.

13. The base station apparatus as in claim 11, wherein the processor is further configured to estimate the first speed and the second speed by computing frequency offset measurement errors and estimating the first speed and the second speed as a function of the frequency offset measurement errors.

14. The base station apparatus as in claim 13, wherein the processor is further configured to compute the frequency offset measurement errors by averaging previous frequency observations.

15. The base station apparatus as in claim 13, wherein the processor is further configured to model the function based on a priori measurements of received signals.

* * * * *